(12) United States Patent
Nilsson

(10) Patent No.: US 10,465,779 B2
(45) Date of Patent: Nov. 5, 2019

(54) ELECTRICAL AXLE

(71) Applicant: BorgWarner Sweden AB, Landskrona (SE)

(72) Inventor: Kristoffer Nilsson, Lund (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 15/563,083

(22) PCT Filed: Apr. 1, 2016

(86) PCT No.: PCT/EP2016/057208
§ 371 (c)(1),
(2) Date: Sep. 29, 2017

(87) PCT Pub. No.: WO2016/156566
PCT Pub. Date: Oct. 6, 2016

(65) Prior Publication Data
US 2018/0080536 A1    Mar. 22, 2018

(30) Foreign Application Priority Data

Apr. 2, 2015  (SE) ...................................... 1550402

(51) Int. Cl.
| | |
|---|---|
| *B60K 1/00* | (2006.01) |
| *F16H 37/08* | (2006.01) |
| *F16H 48/36* | (2012.01) |
| *B60K 17/04* | (2006.01) |
| *B60K 17/08* | (2006.01) |
| *F16H 3/54* | (2006.01) |

(52) U.S. Cl.
CPC ........... *F16H 37/0813* (2013.01); *B60K 1/00* (2013.01); *B60K 17/046* (2013.01); *B60K 17/08* (2013.01); *F16H 3/54* (2013.01); *F16H 48/36* (2013.01); *B60K 2001/001* (2013.01); *F16H 2048/364* (2013.01); *F16H 2048/368* (2013.01); *F16H 2200/0034* (2013.01); *F16H 2200/2005* (2013.01); *F16H 2200/2064* (2013.01); *F16H 2200/2094* (2013.01)

(58) Field of Classification Search
CPC .... F16H 48/05; F16H 48/36; F16H 2048/364; F16H 2048/368; B60K 2001/001
See application file for complete search history.

(56) References Cited

U.S. PATENT DOCUMENTS

2013/0130857 A1    5/2013  Gassmann

FOREIGN PATENT DOCUMENTS

| DE | 102013204227 A1 | 9/2014 |
|---|---|---|
| JP | 2009152243 A | 7/2009 |
| WO | 2010/101506 A1 | 9/2010 |
| WO | 2012/066035 A1 | 5/2012 |

*Primary Examiner* — Erin D Bishop
(74) *Attorney, Agent, or Firm* — BrooksGroup

(57) ABSTRACT

An electrical axle comprising an electrical motor selectively connected to a differential via a reduction gear and a planetary gear set, the planetary gear set having one input and two outputs, the electrical axle further comprises a gear shift mechanism configured to selectively connect a differential housing to one of the outputs.

8 Claims, 3 Drawing Sheets

ELECTRICAL AXLE

This application claims the benefit of Swedish Application No. 1550402-0 filed Apr. 2, 2015 and PCT Application No. EP2016/057208 filed Apr. 1, 2016.

TECHNICAL FIELD

The present invention relates to an electrical axle. More particularly, the present invention relates to an electrical axle for a four wheeled vehicle, such as a passenger car.

BACKGROUND

The electrical power system of today's passenger cars is based on 12V. Due to the relatively low voltage proposed solutions for high electrical power utilities, such as electrically powered propulsion units, results in high currents which causes high losses and increased cable dimensions.

During recent years there is a trend of adding a 48V electrical power system to the already existing 12V system. As the electrical power increases new and improved solutions may be applicable, replacing the previous solutions requiring additional high power electronics.

One such example is the hybrid technology, i.e. the technology of adding electric drive to existing internal combustion engine drives, and allowing the vehicle to be driven either electrically, by the internal combustion engine, or both. The present applicant has previously presented several solutions for hybrid drive, e.g. as being described in WO2010101506 or in WO2012066035. These systems comprise a high power electrical motor for propulsion purposes, and a smaller electrical motor for torque vectoring purposes. Should 48V be available, it would be possible to develop a design for hybrid drive using far less complex components, including power supplies, power electronics, etc.

SUMMARY

It is an object of the present invention to provide an electrical axle which may be used for hybrid drive in four wheeled vehicles. The electrical axle may be configured to operate on a medium to high voltage, such as 48V, although being substantially lower than existing high voltage systems for hybrid technology (e.g. 300V).

According to a specific aspect an electrical axle according to the independent claim is provided. Preferred embodiments are defined by the appended dependent claims.

BRIEF DESCRIPTION OF DRAWINGS

The invention will be described in further detail under reference to the accompanying drawings in which.

DETAILED DESCRIPTION

Figure 1:
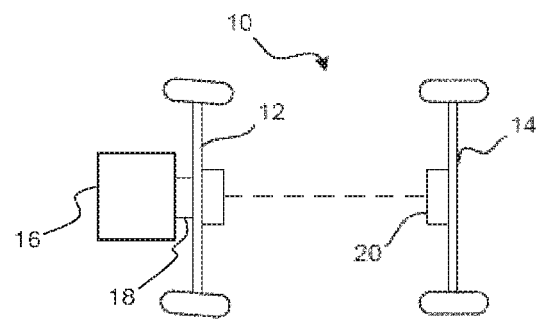
FIG. 1 is a schematic view of a vehicle having an electrical axle according to an embodiment.
Figure 2:
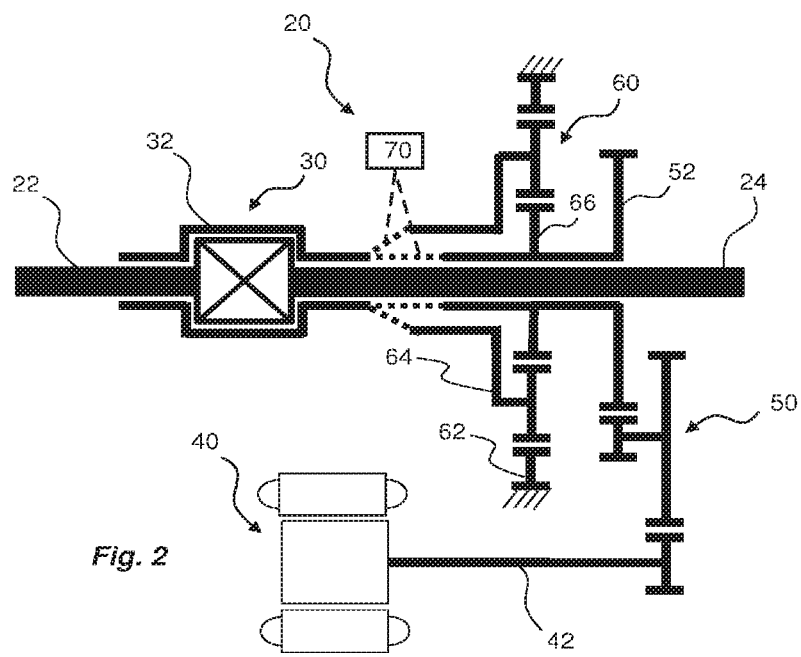
FIG. 2 is a schematic cross-sectional view of an electrical axle according to an embodiment.

In the following various embodiments of a torque vectoring device will be described. Starting with FIG. 1, a drive line arrangement 10 for a four wheeled vehicle is shown. The drive line arrangement 10 comprises a front axle 12 and a rear axle 14. The front axle 12 is driven by means of an engine 16, such as an internal combustion engine, via a gearbox 18. The rear axle 14 is provided with an electrical axle arrangement 20 for allowing hybrid drive of the vehicle; i.e. to allow for rear drive only, four wheel drive, or front wheel drive only. Before turning into the details of the electrical axle, it should be realized that the electrical axle, as described herein, is by no means limited to the drive line configuration shown in FIG. 1. To the contrary, the presented electrical axle could be used for various drive line configurations with or without the provision of engines.

Hybrid drive is normally desired for passenger cars or other four-wheeled vehicles. Hybrid drive may either represent the possibility to change driving source from an internal combustion engine to an electrical motor or vice versa, or the possibility to use an electrical motor driving a front or rear axle, in addition to an internal combustion engine driving the other one of the front or rear axle, in order to provide all wheel drive.

The electrical axle is however not limited to hybrid drives, but could also be used for purely electrical drive line configurations.

Now turning to FIGS. 2-5 an embodiment of an electrical axle 20 will be described. The electrical axle 20 has a left drive shaft 22 and a right drive shaft 24. The drive shafts 22, 24 are connected to the two outputs of a differential 30, having a differential housing 32 receiving rotational drive torque from an electrical motor 40 and transmitting corresponding driving torque to the drive shafts 22, 24. The electrical motor 40 is arranged non-coaxial with respect to the drive shafts 22, 24 and has a rotational shaft 42 which is coupled, preferably by a reduction gear 50, to the differential housing 32. The reduction gear 50 comprises one or more gears meshing with each other for providing the desired reduction. In the shown example, the reduction gear 50 is a two-stage reduction gear designed to provide a speed reduction from the electrical motor 40 of a ratio approximately 12-14:1.

The final gear 52 of the reduction gear 50 is preferably a hollow shaft surrounding the drive shaft 24. The final gear 52 is rotationally secured to a further gear 66 which forms a sun gear of a planetary gear set 60. Hence, when the electrical motor 40 is running the sun gear 66 rotates accordingly at a speed reduced by a factor set by the reduction gear 50.

The planetary gear set 60 further comprises a planet carrier 64 supporting a number of planets (not shown) in gear engagement with the sun gear 66 as well as with a ring gear 62. The gear reduction between the planet carrier 64 and the sun gear 66 is approximately 3-4:1. The ring gear 62 is kept stationary during operation.

Figure 3:
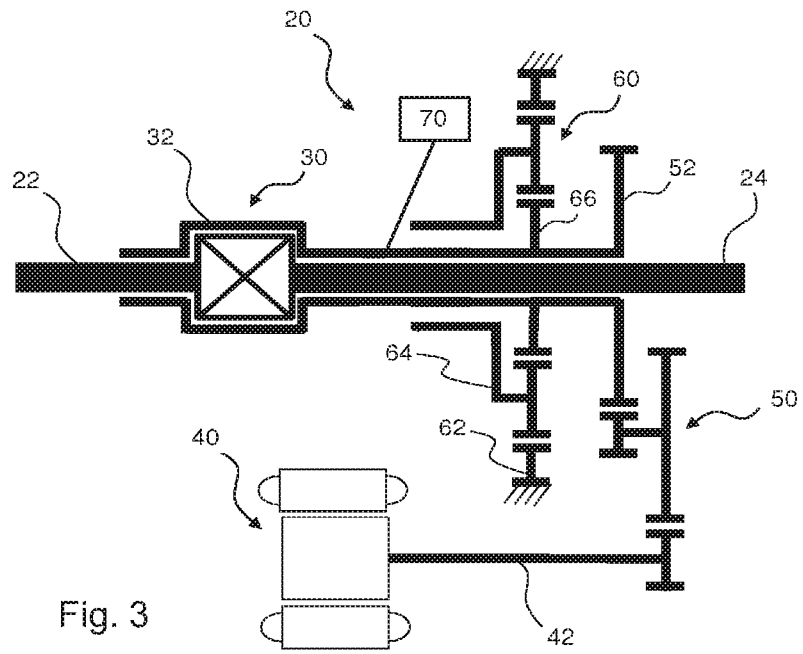
FIG. 3 is a schematic cross-sectional view of an electrical axle according to an embodiment.

The electrical axle 20 further comprises a gear shift mechanism 70 for allowing a speed change of the electrical axle 70. As can be seen in FIG. 3 the gear shift mechanism 70 can be actuated to provide a high range speed, in which the differential housing 32 is rotationally connected with the sun gear 66. In this mode, the gear reduction is the same as the reduction gear 50, i.e. approximately 12-14:1. The electrical motor 40 may be designed such that the peak wheel torque is between 500 and 600 Nm in high range speed.

Figure 4:
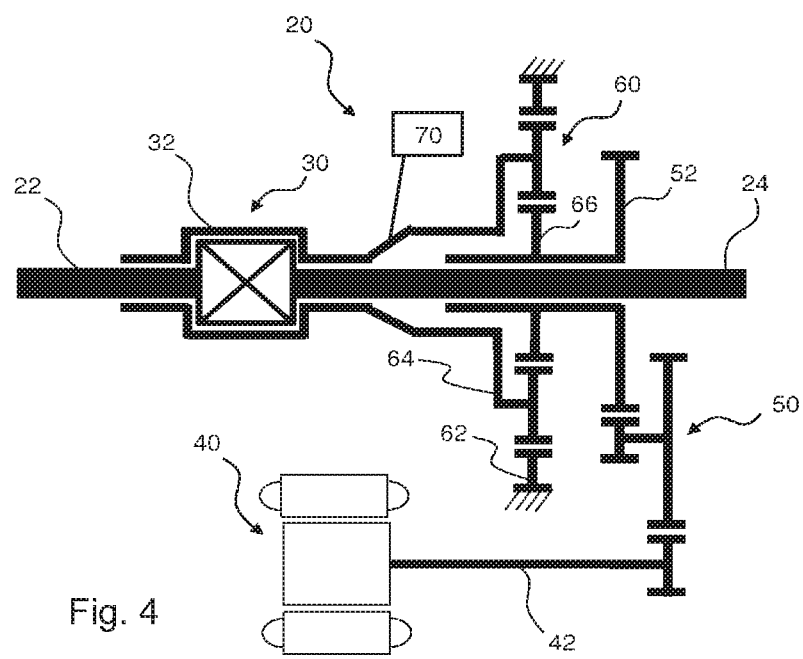
FIG. 4 is a schematic cross-sectional view of an electrical axle according to an embodiment.

Referring to FIG. 4, the gear shift mechanism 70 may be actuated such that the differential housing 32 is disconnected from the sun gear 66 but instead is connected to the planet carrier 64, thus achieving a low range speed of the electrical axle 20. In this mode, the speed reduction is approximately 36-45:1, and the peak wheel torque may be between 1600 and 2000 Nm.

Figure 5:
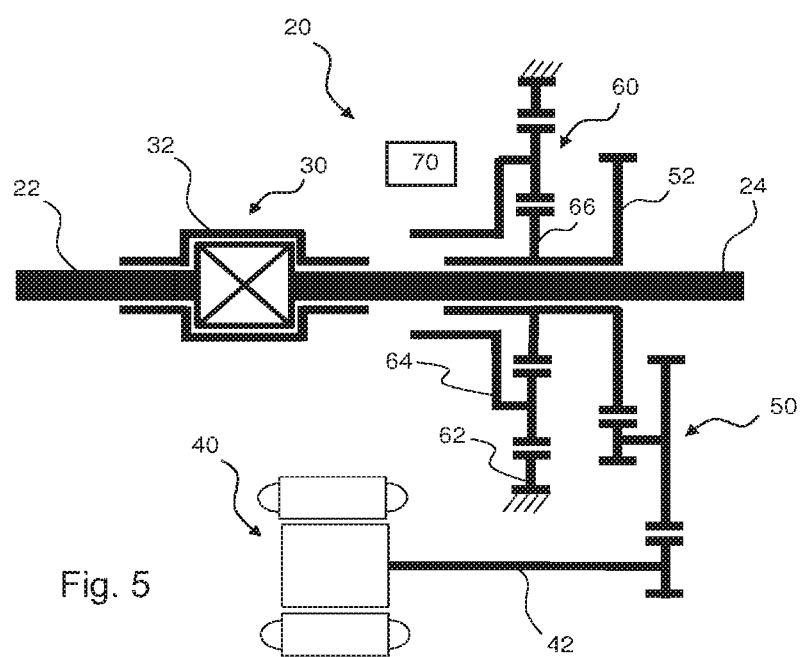
FIG. 5 is a schematic cross-sectional view of an electrical axle according to an embodiment.

Referring to FIG. 5, in addition to this, the gear shift mechanism 70 may also be actuated in a neutral mode, in which the sun gear 66 as well as the planet carrier 64 is disconnected from the differential housing 32. In the neutral mode, all transmission components except for the differential 30 and the drive shafts 22, 24 are stationary, leading to low losses.

The gear shift mechanism 70 may e.g. be realized by a dog clutch, whereby synchronization is not required.

The described example of the electrical axle 20 is advantageous in that it can be realized with an electrical motor 40 having a relatively low maximum torque (e.g. approximately 45 Nm). Further, it is not necessary to have a coaxial design, which further reduces costs. By having a comparatively high speed reduction for low range it is possible to reduce the motor torque, while still having a sufficient torque for achieving full traction at low speeds.

The invention claimed is:

1. An electrical axle, comprising an electrical motor which is selectively connected to a differential via a reduction gear and a planetary gear set, said planetary gear set having one input and two outputs, wherein the electrical axle further comprises a gear shift mechanism configured to selectively connect a differential housing to one of said outputs, wherein the electrical motor is driving a sun gear of the planetary gear set, which sun gear forms the input of the planetary gear set, and wherein the outputs are a planet carrier and the sun gear of the planetary gear set.

2. The electrical axle according to claim 1, wherein the gear shift mechanism is further configured to be selectively disconnected from both outputs.

3. The electrical axle according to claim 1, wherein the electrical motor is arranged non-coaxially with drive shafts being connected to said differential.

4. The electrical axle according to claim 1, wherein the sun gear forms a hollow shaft surrounding a drive shaft.

5. The electrical axle according to claim 1, wherein the speed reduction of the reduction gear is approximately 12-14:1.

6. The electrical axle according to claim 1, wherein the speed reduction between the sun gear and the planet carrier is approximately 3-4:1.

7. The electrical axle according to claim 1, wherein the gear shift mechanism is a dog clutch.

8. A vehicle, comprising an electrical axle comprising an electrical motor which is selectively connected to a differential via a reduction gear and a planetary gear set, said planetary gear set having one input and two outputs, wherein the electrical axle further comprises a gear shift mechanism configured to selectively connect a differential housing to one of said outputs, wherein the electrical motor is driving a sun gear of the planetary gear set, which sun gear forms the input of the planetary gear set, and wherein the outputs are a planet carrier and the sun gear of the planetary gear set.

* * * * *